United States Patent
Takahashi et al.

(10) Patent No.: US 6,463,587 B1
(45) Date of Patent: Oct. 8, 2002

(54) DATA TRANSMISSION APPARATUS AND DATA TRANSMISSION METHOD

(75) Inventors: Kiyoshi Takahashi, Tokyo; Masami Noritomi, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/054,196

(22) Filed: Apr. 2, 1998

(30) Foreign Application Priority Data

Apr. 4, 1997 (JP) ............................................. 9-086348

(51) Int. Cl.[7] ............................................... H04N 7/173
(52) U.S. Cl. ............................. 725/91; 725/92; 725/93; 725/103; 725/114; 725/115; 725/116; 709/219; 709/231; 709/232
(58) Field of Search ........................... 725/91, 98, 103, 725/114, 119, 115, 116, 117, 92, 93, 97; 709/232, 219, 231

(56) References Cited

U.S. PATENT DOCUMENTS

| | | | | |
|---|---|---|---|---|
| 5,168,481 A | | 12/1992 | Culbertson et al. ............. 369/2 |
| 5,428,393 A | * | 6/1995 | Enokida .................... 348/391.1 |
| 5,522,090 A | | 5/1996 | Tanaka et al. ............... 395/894 |
| 5,559,549 A | * | 9/1996 | Hendricks et al. ........ 707/104.1 |
| 5,576,755 A | * | 11/1996 | Davis et al. ................. 345/721 |
| 5,586,264 A | * | 12/1996 | Belknap et al. ............... 725/47 |
| 5,600,573 A | * | 2/1997 | Hendricks et al. .......... 710/308 |
| 5,610,841 A | * | 3/1997 | Tanaka et al. ............... 709/231 |
| 5,666,645 A | * | 9/1997 | Thomas et al. ................ 725/93 |
| 5,712,976 A | * | 1/1998 | Falcon, Jr. et al. .......... 725/115 |
| 5,751,282 A | * | 5/1998 | Girard et al. .................. 725/50 |
| 5,761,417 A | * | 6/1998 | Henley et al. ............... 725/109 |
| 5,944,796 A | * | 8/1999 | Noritomi ...................... 725/48 |
| 6,088,703 A | * | 7/2000 | Kaneko ....................... 709/232 |
| 6,314,577 B1 | * | 11/2001 | Pocock ........................ 725/115 |

FOREIGN PATENT DOCUMENTS

| | | |
|---|---|---|
| EP | 0697 703 | 2/1996 |
| WO | WO 95/13582 | 5/1995 |

* cited by examiner

*Primary Examiner*—Andrew Faile
*Assistant Examiner*—Ngoc Vu
(74) *Attorney, Agent, or Firm*—Frommer Lawrence & Haug LLP; William S. Frommer; Darren M. Simon

(57) ABSTRACT

A data transmission apparatus having unit modules connected in cascade in a plurality (x; $2 \leq x$) of stages and a list converting means, wherein each of the unit modules has a recording and/or reproducing means, a first-list generating means for generating a first list indicating the data to be recorded in the recording and/or reproducing means, a second-list receiving means for receiving a second list indicating the data to be reproduced from the recording and/or reproducing means, and a data supplying means for supplying the reproduced data to the next stage unit module; the recording and/or reproducing means of each of the unit modules records the data indicated in the first list generated by the first-list generating means among the data supplied from the outside and reproduces the data indicated in the second list received at the second-list receiving means; and the list converting means converts a first list generated by a first-list generating means of a $y(2 \leq y \leq x)$th stage unit module to a second list and outputs the same to the second-list receiving means of all unit modules or some unit modules of the (y−1)th stage.

7 Claims, 7 Drawing Sheets

FIG. 4

FILING-LIST

| no | START HH:MM:SS | ID | TITLE | SOM HH:MM:SS | DUR HH:MM:SS | BIN | STATUS |
|---|---|---|---|---|---|---|---|
| 1 | START1 | ID1 | TITLE1 | SOM1 | DUR1 | BIN1 | STATUS1 |
| 2 | START2 | ID2 | TITLE2 | SOM2 | DUR2 | BIN2 | STATUS2 |
| 3 | START3 | ID3 | TITLE3 | SOM3 | DUR3 | BIN3 | STATUS3 |
| 4 | START4 | ID4 | TITLE4 | SOM4 | DUR4 | BIN4 | STATUS4 |
| 5 | START5 | ID5 | TITLE5 | SOM5 | DUR5 | BIN5 | STATUS5 |
| ⋮ | ⋯ | ⋯ | ⋯ | ⋯ | ⋯ | ⋯ | ⋯ |
| P | STARTp | IDp | TITLEp | SOMp | DURp | BINp | STATUSp |

PLAY-LIST

| no | START HH:MM:SS | ID | SEG * | TITLE | SOM HH:MM:SS | DUR HH:MM:SS | BIN | Pulse 12LB | STATUS * |
|---|---|---|---|---|---|---|---|---|---|
| 1 | START1 | ID1 | | TITLE1 | SOM1 | DUR1 | BIN1 | LB1 | STATUS1 |
| 2 | START2 | ID2 | | TITLE2 | SOM2 | DUR2 | BIN2 | LB2 | STATUS2 |
| 3 | START3 | ID3 | | TITLE3 | SOM3 | DUR3 | BIN3 | LB3 | STATUS3 |
| 4 | START4 | ID4 | | TITLE4 | SOM4 | DUR4 | BIN4 | LB4 | STATUS4 |
| 5 | START5 | ID5 | | TITLE5 | SOM5 | DUR5 | BIN5 | LB5 | STATUS5 |
| ... | ... | ... | | ... | ... | ... | ... | ... | ... |
| P | STARTp | IDp | | TITLEp | SOMp | DURp | BINp | LBp | STATUSp |

500 501 502 503 504 505 506 507 508 509
510

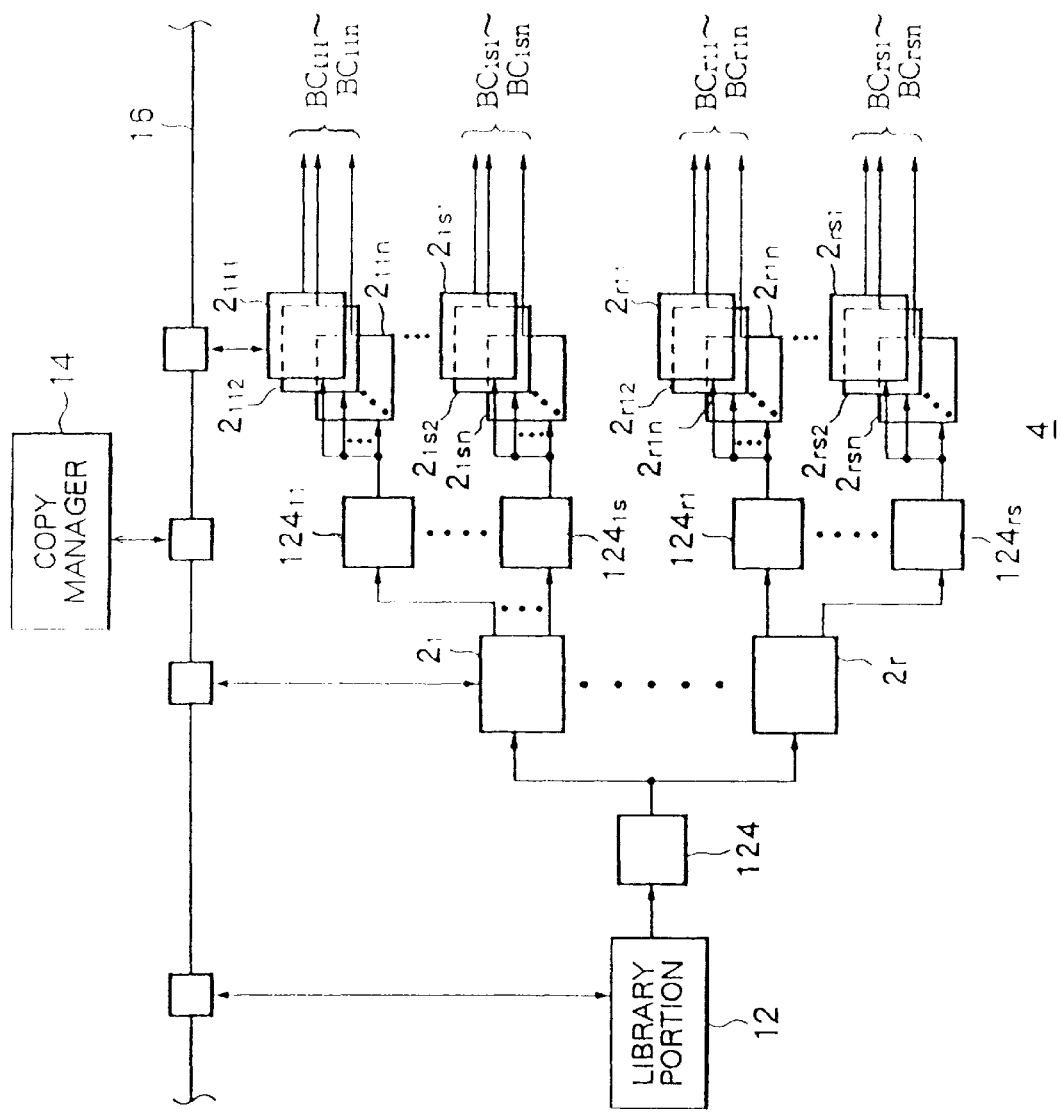

DATA TRANSMISSION APPARATUS AND DATA TRANSMISSION METHOD

BACKGROUND OF THE INVENTION

1. Field of the Invention

The present invention relates to a data transmission apparatus and data transmission method, more particularly to a data transmission apparatus and data transmission method in for example a cable television company broadcasting over multiple channels and equipped with a recording and/or reproducing system which stores all of the audio and/or video data of programs and commercials to be broadcast over the different channels all together and reproduces the audio and/or video data of the individual programs or commercials for transmission over individual channels.

2. Description of the Related Art

In recent years, cable TV (CATV) companies etc. have been upgrading their systems so offer a greater number of channels. Along with this, there is a growing demand for systems which, unlike the video tape recorders of the related art, enable simultaneous recording or reproduction of audio and/or video data of several programs or commercials to or from a single audio and/or video data recording and reproducing apparatus and, further, simultaneous recording and reproduction. In response to this demand, apparatuses called "video servers" (or called "AV (audio and/or video) servers") using hard disks and other randomly accessible recording media are being increasingly used for recording and reproducing the audio and/or video data.

In general, a video server in a cable television company must be able to transfer data at a fast rate due to the demands on image quality and sound quality and must have a large storage capacity in order to be able to record long hours of data. Effort has been made to speed up the rate of transfer of data and increase the storage capacity by using data recording and reproducing apparatuses equipped with a bank of hard disk drives for parallel storage and processing of audio and/or video data. In addition, effort has been made to ensure reliable service even if one or more of the hard disk drives malfunctions by the recording of parity data. These efforts have enabled the realization of a multi-channel video server which can simultaneously transmit audio and/or video data of several programs or commercials, recorded in a dispersed manner, over multiple channels or can transmit the same data over multiple channels shifted in timing of reproduction even when the number of channels required for transmission differ due to the content or format of the program or commercial to be broadcast and therefore can offer a variety of services, for example, "video on demand" (VOD) and "near video on demand" (NVOD).

There are, however, many types of cable television companies etc.—from small-sized operations broadcasting over only one to three channels to largesized operations broadcasting over dozens or even hundreds of channels. The functions and performances required for the server system differ in different cable television companies etc.. Therefore, in the past, it had been necessary to individually design server systems in accordance with the scale of operations of the companies etc. The expenses required for designing the systems therefore increased the price of server systems.

Further, such individually designed server systems are difficult to modify, for example, when the cable television company expands its operations and wants to increase the number of channels offered. It is therefore not possible to flexibly increase the number of channels.

Of course, it is possible to simply use the identical configuration server system in different sizes of cable television companies etc., but to do this would require the adoption of a configuration suited to the large sized operation companies etc.. This would end up forcing small sized operations to install unnecessarily large sized, expensive server systems.

SUMMARY OF THE INVENTION

An object of the present invention is to provide data transmission apparatus and data transmission method enabling realization of a data recording and/or reproducing system enabling configuration of a server system tailored to the scale of operations of the cable television company etc. by assembling unit modules of identical configurations.

Another object of the present invention is to provide a data transmission apparatus and data transmission method enabling realization of a data recording and/or reproducing system enabling flexible changes in the specifications of a server system to deal with increases in the number of channels offered by the cable television company etc.

According to a first aspect of the present invention, there is provided a data transmission apparatus having unit modules connected in cascade in a plurality (x; $2 \leq x$) of stages and a list converting means, wherein each of the unit modules has a recording and/or reproducing means, a first-list generating means for generating a first list indicating the data to be recorded in the recording and/or reproducing means, a second-list receiving means for receiving a second list indicating the data to be reproduced from the recording and/or reproducing means, and a data supplying means for supplying the reproduced data to the next stage unit module; the recording and/or reproducing means of each of the unit modules records the data indicated in the first list generated by the first-list generating means among the data supplied from the outside and reproduces the data indicated in the second list received at the second-list receiving means; and the list converting means converts a first list generated by a first-list generating means of a $y(2 \leq y \leq x)$th stage unit module to a second list and outputs the same to the second-list receiving means of all unit modules or some unit modules of the (y−1)th stage.

Preferably, the first list and the second list contain at least status data indicating whether the data indicated by the first list and the second list have been recorded in the recording and/or reproducing means or have not been recorded; and the recording and/or reproducing means of each of the unit modules reproduces the data which the corresponding status data indicates have not been recorded among the data indicated in the received second list.

Alternatively, preferably, the first list and the second list contain at least status data indicating whether the data indicated by the first list and the second list have been recorded in the recording and/or reproducing means or have not been recorded; the first-list generating means of a unit module supplies a third list comprised of the status data indicating data have not been recorded out of the first list to the list converting means; and the list converting means converts the status data of the third list generated by a first-list generating means of a y-th stage unit module to a second list.

Preferably, the data is video data and/or audio data.

According to a second aspect of the present invention, there is provided a data transmission method for transmitting data from unit modules, each including recording and/or reproducing means for recording data supplied from the outside and reproducing the recorded. data, connected in cascade in a plurality of stages (x; $2 \leq x$), comprising a first step of generating a first list indicating data to be recorded in a recording and/or reproducing means of a y(2≦y≦x)th stage unit module; a second step of converting the first list generated at the first step to a second list indicating the data recorded in the recording and/or reproducing means to be reproduced; a third step of outputting the second list converted at the second step to all of the unit modules or some of the unit modules of the (y−1)th stage; and a fourth step of receiving the second list output at the third step and reproducing the recorded data from the recording and/or reproducing means based on the second list.

Preferably, there is the further step of the y-th stage unit module generating the second list and reproducing the data recorded in the recording and/or reproducing means of the y-th stage unit module.

Preferably, there is the further step of a unit module of the (y−1)th stage receiving the second list output at the third step, converting the same to the first list, and recording the data indicated in the first list among the data supplied from the outside in the recording and/or reproducing means of the (y−1)th stage.

BRIEF DESCRIPTION OF THE DRAWINGS

The above objects and features of the present invention will be more apparent from the following description of the preferred embodiments given with reference to the accompanying drawings, wherein:

FIG. 4 is a view of a filing-list generated by a filing-list generating unit shown in FIG. 2;

FIG. 5 is a view of a filing-list generated by a play-list receiving unit shown in FIG. 2;

FIG. 7 is a view of a second modification of an embodiment of the present invention.

DESCRIPTION OF THE PREFERRED EMBODIMENTS

Below, an embodiment of the present invention will be explained.

First, an explanation will be made of the configuration of a server system 1 by referring to FIG. 1.

Figure 1:
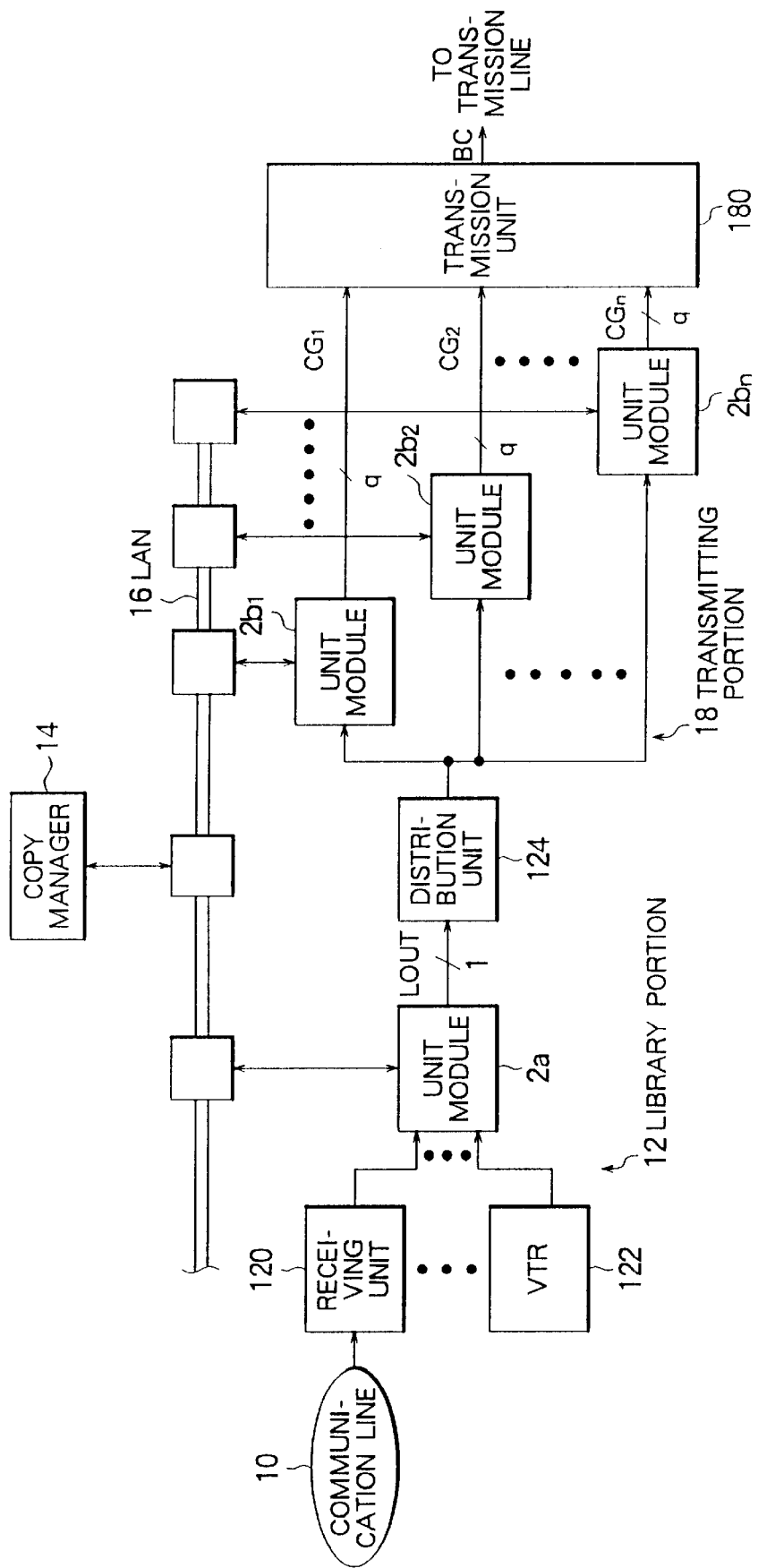
FIG. 1 is a view of the configuration of a server system according to the present invention.

FIG. 1 is a view of the configuration of a server system 1 according to the present invention.

As shown in FIG. 1, the server system 1 comprises a library portion 12, a distribution unit 124, a copy manager 14, a local area network (LAN) 16, and a transmitting portion 18.

The library portion 12 comprises for example a receiving unit 120, a video tape recorder 122, and a unit module 2a and is connected to a relay use communication line 10 and a not illustrated broadcast use transmission line etc.

The transmitting portion 18 comprises n number of unit modules $2b_1$ to $2b_n$ and a transmission unit 180.

A distribution unit 124 (FIG. 1) amplifies and distributes for example audio and/or video data LOUT input from a unit module 2a of the library portion 12. It supplies audio and/or video data of the same content to the unit modules $2b_1$ to $2b_n$ of the transmitting portion 18.

The transmission unit 180 (FIG. 1) multiplexes the audio and/or video data $CG_1$ to $CG_n$ input from the unit modules $2b_1$ to $2b_n$ of the transmitting portion 18 in amounts of one to q number of channels, and transmits the same to the broadcast use transmission line.

Figure 2:
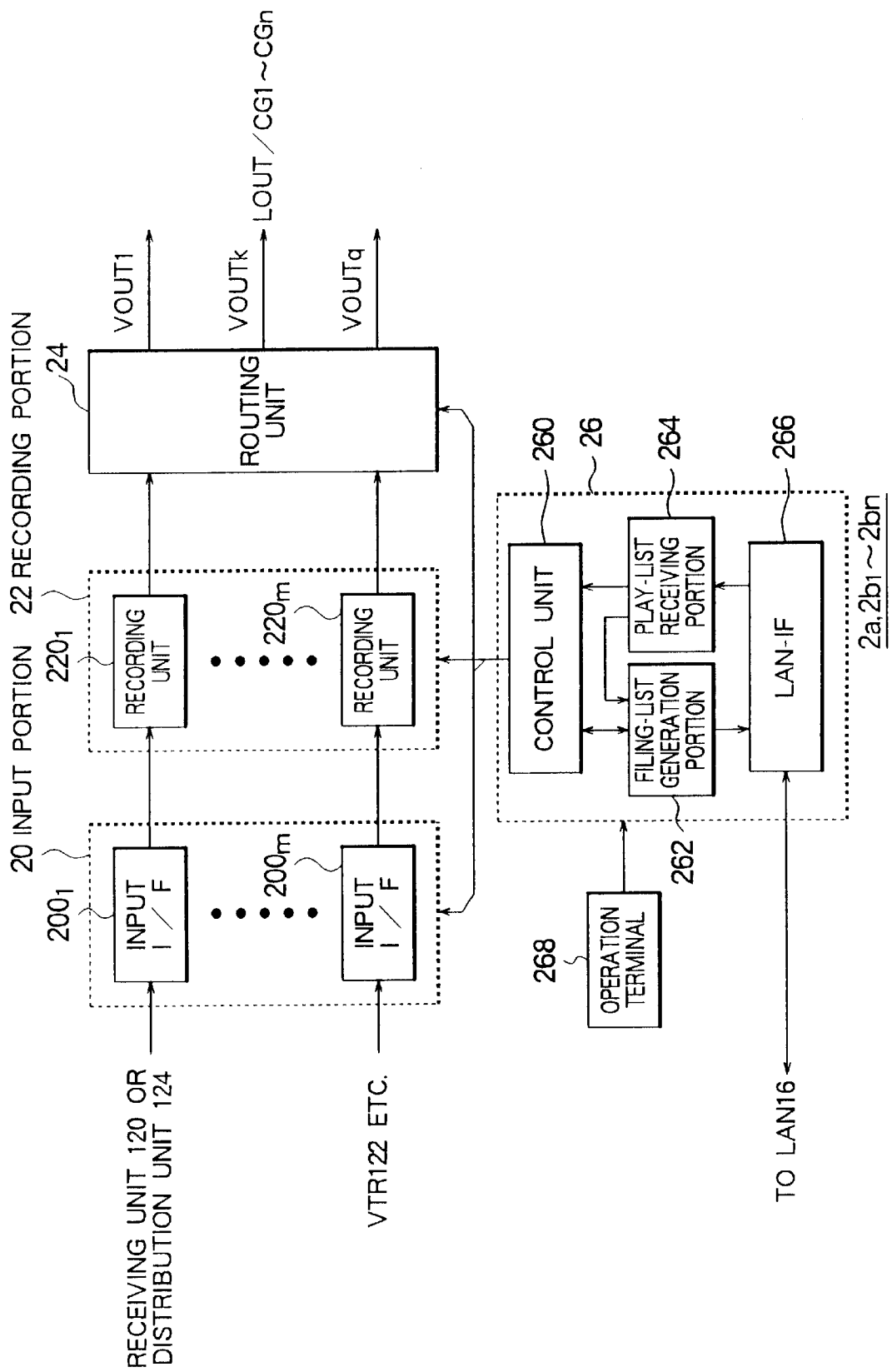
FIG. 2 is a view of the configuration of a unit module of a library portion of the server system shown in FIG. 1.

FIG. 2 is a view of the configuration of the unit module 2a of the library portion 12 of the server system 1 shown in FIG. 1 and the unit modules $2b_1$ to $2b_n$ of the transmitting portion 18.

The unit modules 2a and $2b_1$ to $2b_n$ basically have the same configuration except for the recording capacity of the audio and/or video data and modifications made in accordance with individual system specifications. Each comprises an input portion 20, a recording and/or reproducing unit 22, a routing unit 24, a control unit 26, and a terminal device 268.

The input portion 20 comprises for example m number of input interface circuits (input IF) $200_1$ to $200_m$. Each of the input interface circuits $200_1$ to $200_m$ has a receiving unit 120, the distribution unit 124, a video tape recorder (VTR) 122, etc. connected to it.

The recording and/or reproducing portion 22 comprises m number of recording units $220_1$ to $220_m$ corresponding to the input interface circuit $200_1$ to $200_m$ such as hard disk drives, magneto-optic disk drives, and other devices using nonlinearly accessible recording media and cassette changer devices using cassette tapes as media.

Note that the number of the recording units $220_1$ to $220_m$ does not necessarily have to match the number of the input interface circuit $200_1$ to $200_m$ of the input portion 20. The recording and/or reproducing portion 22 may for example be constituted by a single recording and/or reproducing unit.

The control unit 26 comprises a control unit 260, a filing-list generation portion 262, a play-list receiving portion 264, and a LAN interface (LAN-IF) 266.

Figure 3:
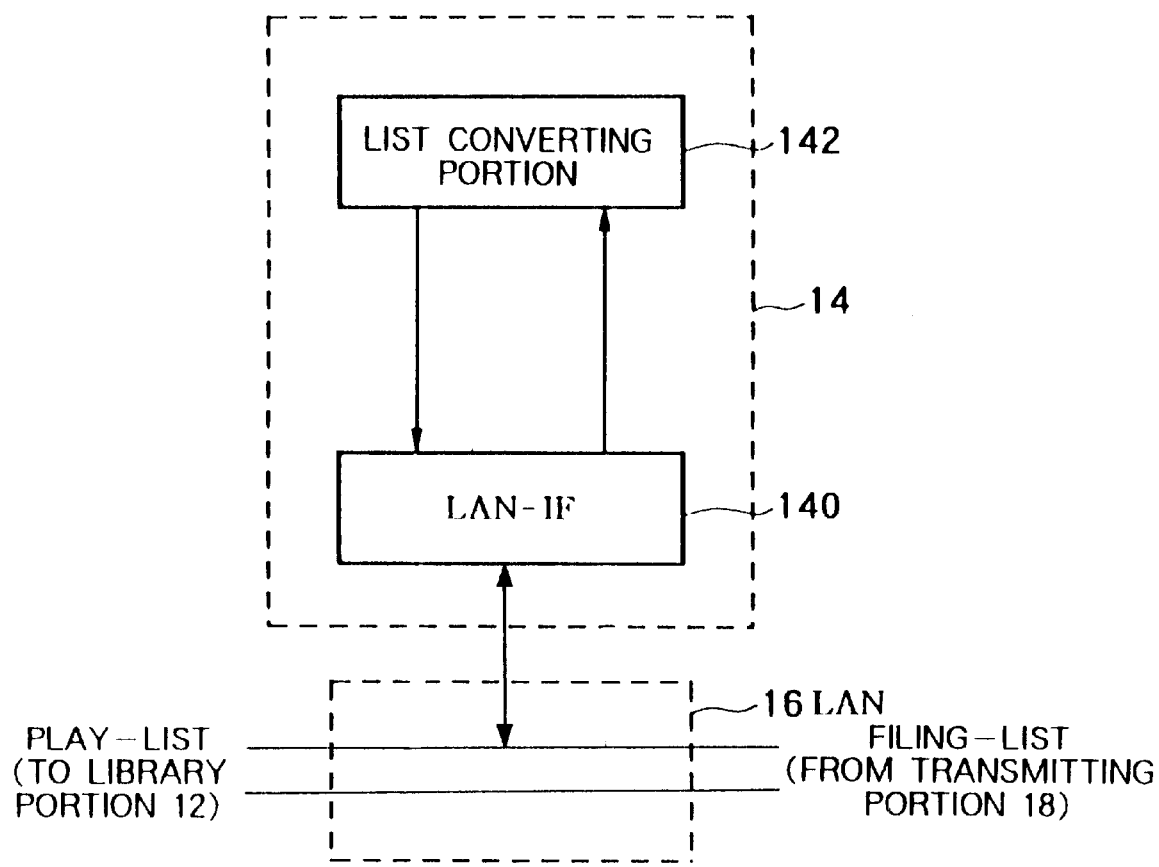
FIG. 3 is a view of the configuration of a copy manager shown in FIG. 1.

FIG. 3 is a view of the configuration of the copy manager 14 shown in FIG. 1.

As shown in FIG. 3, the copy manager 14 is for example a computer connected to the unit module 2a of the library portion 12 and the unit modules $2b_1$ to $2b_n$ of the transmitting portion 18 via the LAN 16 and has a LAN interface 140 and a list converting portion 142.

The server system 1 receives all of the audio and/or video data of programs, commercials, and sports broadcasts to be broadcast using a plurality of channels in for example cable television companies etc. and, further, text data or other data from the communication line 10 etc. from the library portion 12 and records and manages it all together. Further, the server system 1 records and manages the audio and/or video data supplied by the library portion 12 by the unit modules $2b_1$ to $2b_n$ of the transmitting portion 18 corresponding to these plurality of channels, reproduces it in accordance with the scheduled broadcast times of the programs etc., and transmits it to the broadcast use transmission line.

Next, an explanation will be made of the operation of the unit modules 2a and $2b_1$ to $2b_n$ and the operation of the units constituting the unit modules 2a and $2b_1$ to $2b_n$. First, an explanation will be made of the operation of the unit module 2a of the library portion 12.

In the library portion 12, the unit module 2a receives for example the audio and/or video data indicated in the filing-list (explained later referring to FIG. 4) prepared by a user using the terminal device 268 from the receiving unit 120 and the VTR device 122 etc. and records the same.

Further, the unit module 2a reproduces the audio and/or video data indicated by the play-list (explained later referring to FIG. 5) input from the transmitting portion 18 via the copy manager 14 and the LAN 16 and supplies the same to all of the unit modules $2b_1$ to $2b_n$ of the transmitting portion 18 via the distribution unit 124.

The unit modules $2b_1$ to $2b_n$ in the transmitting portion 18 for example reproduce the audio and/or video data of each of the plurality of channels indicated by the play-list prepared by the user using the terminal device 268 in accordance with the scheduled broadcast time thereof.

Further, the unit modules $2b_1$ to $2b_n$ generate the filing-list indicating the audio and/or video data to be recorded and output the same via the copy manager 14 and the LAN 16 to the unit module 2a of the library portion 12.

In the unit modules 2a and $2b_1$ to $2b_n$, each of the input interface circuit $200_1$ to $200_m$ of the input portion 20 operates under the control of the control unit 260 of the control unit 26, receives the audio and/or video data input from the receiving unit 120 and VTR device 122 or other outside device such as the distribution unit 124, and outputs the same to the recording portion 22.

The recording units $220_1$ to $220_m$ constituting the recording and/or reproducing portion 22 operate under the control of the control unit 260, respectively record the audio and/or video data input via the input interface circuits $200_1$ to $200_m$, reproduce the recorded audio and/or video data, and output the same to the routing unit 24.

The routing unit 24 has q($1 \leq q$) number of output terminals $VOUT_1$ to $VOUT_q$, operates under the control of the control unit 260, switches the audio and/or video data input from the recording units $220_1$ to $220_m$ to selected predetermined output terminals $VOUT_1$ to $VOUT_q$, and outputs the same to the distribution unit 124 or the transmission unit 180.

Note that, in the library portion 12, the routing unit 24 of the unit module 2a outputs for example the audio and/or video data from only one ($VOUT_k$: $1 \leq k \leq q$) from among the q number of output terminals $VOUT_1$ to $VOUT_q$.

Further, in the transmitting portion 18, the routing units 24 of the unit modules $2b_1$ to $2b_n$ output the audio and/or video data from all or part of the q number of output terminals $VOUT_1$ to $VOUT_q$.

In the control unit 26, the control unit 260 controls the operation of the parts of the unit modules 2a and $2b_1$ to $2b_n$.

Further, the control unit 260 manages the audio and/or video data recorded in the recording units $220_1$ to $220_m$ and the recording regions thereof.

Further, the control unit 260 controls the recording units $220_1$ to $220_m$ based on the filing-list prepared by the user using the terminal device 268 or the filing-list generated by the filing-list generation portion 262 so as to make them record only the audio and/or video data indicated by the filing-list among the audio and/or video data input from the receiving unit 120 and the VTR 122 or other outside device, or from the unit module 2a of the library portion 12, via the distribution unit 124.

Further, the control unit 260 controls the recording units $220_1$ to $220_m$ based on the play-list prepared by the user using the terminal device 268 or the play-list from the unit module 2a of the library portion 12 received by the play-list receiving portion 264 so as to make them successively reproduce the audio and/or video data indicated in the play-list among the audio and/or video data recorded in the recording units $220_1$ to $220_m$ at the times indicated in the play-list.

Further, the control unit 260 has a self diagnosis function for diagnosing whether or not trouble has occurred in the different parts of the unit modules 2a and $2b_1$ to $2b_n$. It reports on for example the occurrence of trouble and the contents of occurred trouble via the LAN 16 in response to an inquiry of the copy manager 14.

Next, an explanation will be made of the filing-list generation portion 262. A filing-list is a list indicating what audio and/or video data is to be recorded or has been recorded in the recording units $220_1$ to $220_m$ and is prepared by the operation terminal 268 or the filing-list generation portion 262. The filing-list generation portion 262 generates the filing-list based on the play-list output by the play-list receiving portion 264 or data indicating the audio and/or video data managed by the control unit 260 and outputs this to the control unit 260 and the LAN interface 266. The filing list prepared by the operation terminal 268 is also output to the control unit 260 and the LAN interface 266.

Next, an explanation will be made of the filing-list generated by the filing-list generation portion 262 by further referring to FIG. 4. The filing-list prepared at the operation terminal 268 has a similar configuration.

FIG. 4 is a view of a filing-list 410 generated by the filing-list generation portion 262 shown in FIG. 2.

As shown in FIG. 4, the filing-list 410 is comprised of number data (no) 400, reproduction start time data (START) 401, identifier data (ID) 402, title data (TITLE) 403, recording position data (SOM) 404, time length data (DUR) 405, storage position data (BIN) 406, and status data (STATUS) 407.

In the filing-list, the number data (no) 400 indicates the number attached to the audio and/or video data of each program or commercial.

The reproduction start time data (START) 401 indicates the time for starting the reproduction of each of the audio and/or video data in the form of the hour (HH):minute (MM):second (SS).

The identifier data (ID) 402 indicates the identifier uniquely attached to the audio and/or video data of each program or commercial in the unit modules 2a and $2b_1$ to $2b_n$.

The title data (TITLE) 403 indicates the title of the audio and/or video data of each program or commercial.

The recording position data (SOM) 404 indicates the start of the recording position of the audio and/or video data of each program or commercial in the recording units $220_1$ to $220_m$ in the form of the hour (HH):minute (MM):second (SS).

The time length data (DUR) 405 indicates the time length of the audio and/or video data of each program or commercial recorded in the recording units $220_1$ to $220_m$.

The storage position data (BIN) 406 indicates at which of the recording units $220_1$ to $220_m$ the audio and/or video data is recorded or, when the recording and/or reproducing portion 22 is one cassette changer device, the storage position of the cassette recording medium on which the when the audio and/or video data is recorded.

The status data (STATUS) 407 indicates the status, for example, if the audio and/or video data is recorded (filed) or not recorded (not filed) in the recording units $220_1$ to $220_m$ or, when the audio and/or video data is recorded on the tape recording medium, if the tape recording medium on which the audio and/or video data is recorded is rewound.

Next, an explanation will be made of the operation of the play-list receiving portion 264. A play-list is a list indicating when to reproduce the data containing the audio and/or video data recorded in the recording units 220 and is generated at the operation terminal 268 or the play-list receiving portion 264.

The play-list receiving portion 264 outputs a play-list generated by using the operation terminal 268 or received from the unit module 2a of the library portion 12 to the filing-list generation portion 262 and the control unit 260.

The filing-list generated by the play-list receiving portion 264 will be explained next by referring to FIG. 5.

FIG. 5 is a view of a play-list 510 generated by the play-list receiving portion 264 shown in FIG. 2.

As shown in FIG. 5, the play-list is comprised by a number data (no) 500, reproduction start time data (START) 501, identifier data (ID) 502, SEG data 503, title data (TITLE) 504, recording position data (SOM) 505, time length data (DUR) 506, storage position data (BIN) 507, pulse 12LB data 508, and status data (STATUS) 509.

That is, the play-list is configured as the number data (no), reproduction start time data (START), identifier data (ID), recording position data (SOM), time length data (DUR), storage position data (BIN), and status data (STATUS) of the same contents as those of the filing data shown in FIG. 4 plus the SEG data and pulse 12LB data.

In the play-list, the SEG data is used for the control between the library portion 12 and the transmitting portion 18.

The pulse 12LB data indicates the timing of reproduction of the audio and/or video data in the unit modules 2a and $2b_1$ to $2b_n$.

Note that other than the above two types of data, the data contained in the play-list are the same as the data contained in the filing data.

In the library portion 12, the LAN interface 266 of the unit module 2a outputs the play-list input from the copy manager 14 via the LAN 16 to the play-list receiving portion 264.

Further, in the transmitting portion 18 (FIG. 1), the LAN interface circuits 266 of the unit modules $2b_1$ to $2b_n$ receive the filing-list input from the filing-list generation portion 262 and output the same via the LAN 16 to the copy manager 14.

Next, an explanation will be made of the operation of the copy manager 14.

In the copy manager 14, the LAN interface 140 (FIG. 3) outputs the filing-list (FIG. 4) input from the unit modules $2b_1$ to $2b_n$ of the transmitting portion 18 via the LAN 16 to the list converting portion 142.

Further, the LAN interface 140 outputs the play-list (FIG. 5) input from the list converting portion 142 via the LAN 16 to the unit module 2a of the library portion 12.

The list converting portion 142 adds the SEG data and pulse 12LB data (FIG. 5) to the filing-list (FIG. 4) input from the transmitting portion 18 via the LAN 16, converts this to the play-list, and outputs the same via the LAN 16 to the library portion 12.

Next, an explanation will be made of the operation of each unit module in an entire server system.

First, at the transmitting portion 18, each of the unit modules $2b_1$ to $2b_n$ prepares a play-list using the terminal device 268. The play-list, that is, a transmission list, is prepared for the reproduction and transmission of the audio and/or video data recorded in the recording and reproducing apparatuses of the transmitting portion 18. The play-list can be prepared in not only the terminal device 268, but also from a not illustrated terminal connected to the LAN 16.

The play-list receiving portion 264 receives the prepared play-list and outputs the same to the filing-list generation portion 262 and the control unit 260.

The filing-list generation portion 262 deletes the SEG data and pulse 12LB data from the prepared play-list to generate the filing-list. Further, it changes the status data (STATUS) of the play-list based on the audio and/or video data recorded in the recording units $220_1$ to $220_m$ managed by the control unit 260 so as to prepare the filing-list. Namely, it prepares a filing-list indicating audio and/or video data not filed from the play-list if there is no audio and/or video data to be transmitted in the play-list indicating the audio and/or video data to be transmitted from the transmitting portion 18.

The generated filing-list is output to the copy manager 14 via the LAN 16.

The filing-list output from each unit module constituting the transmitting portion 18 is output to the copy manager 14. The copy manager 14 may prepare the play-list from this filing-list and output the same to the library portion 12. Here, the filing-list is converted to a play-list. Alternately, since the play-list receiving portion 264 receives the list at the unit modules 2a and $2b_1$ to $2b_n$, the filing-list itself may be output to the library portion 12. Namely, if the copy manager 14 outputs the filing-list input from a unit module of the transmitting portion 18 to the library portion 12, the library portion 12 will receive this filing-list at the play-list receiving portion 264 which will interpret the list as though it was a play-list. Hence, the play-list which should have been received at the play-list receiving portion 264 can alternatively be obtained by simply inputting the filing-list itself and having it be recognized as though it was a play-list by the library portion 12. Accordingly, the copy manager 14 can simply output the input filing-list to the library portion 12 as is.

The play-list receiving portion 264 of the library portion 12 outputs the play-list input via the LAN 16 or the filing-list as the play-list of the library portion 12 to the filing-list generation portion 262 and the control unit 260.

The control unit 260 outputs the audio and/or video data recorded in the recording units $220_1$ to $220_m$ to the transmitting portion 18 based on the play-list output from the play-list receiving portion 264. Here, when the audio and/or video data which should be transmitted is not in the recording units $220_1$ to $220_m$ of the transmitting portion 18, the audio and/or video data necessary for the transmitting portion 18 will be recorded from the library portion 12 in the recording units $220_1$ to $220_m$ of the transmitting portion 18 according to the above processing.

Further, the play-list received at the play-list receiving portion 264 is output to the filing-list generation portion 262. The filing-list generation portion 262 generates the filing-list based on this play-list. The generated filing-list is output to the control unit 260.

The control unit 260 records the required audio and/or video data in the recording units $220_1$ to $220_m$ based on this input filing-list. Namely, if the audio and/or video data which should be transmitted is not recorded in the transmitting portion 18 and it is desired to transmit audio and/or video data recorded in the library portion 12 to the transmitting portion 18, but the audio and/or video data which should be transmitted is not recorded in the library portion 12 either, the required audio and/or video data will be recorded in the recording units $220_1$ to $220_m$ of the library portion 12 by this processing.

Specifically, the control unit 260 controls the recording units $220_1$ to $220_m$ so as to make them successively record the audio and/or video data which the status data (STATUS) of the filing-list indicates is not recorded (NOT FILED).

When the play-list from the play-list receiving portion 264 is input, the control unit 260 controls the recording units $220_1$ to $220_m$ so as to make them successively reproduce the audio and/or video data described in the play-list.

The reproduced audio and/or video data is output to the distribution unit 124.

The distribution unit 124 outputs the audio and/or video data input from the unit module 2a to all of the unit modules $2b_1$ to $2b_n$ of the transmitting portion 18.

Note that, in the library portion 18, the recording and reproduction of the audio and/or video data are simultaneously carried out in parallel.

In this way, the same audio and/or video data is output to all of the unit modules $2b_1$ to $2b_n$, and the unit modules $2b_1$ to $2b_n$ record the required audio and/or video data. By this, even if several modules among the unit modules $2b_1$ to $2b_n$ need audio and/or video data of the same commercial etc., the unit module 2a need only reproduce and transmit this audio and/or video data one time.

Note that when the transmitting portion 18 records the audio and/or video data from the library portion 12, it is necessary to synchronize the operations of the transmitting portion 18 and the library portion 12, but for example it is possible to correctly synchronize the operations of the transmitting portion 18 and the library portion 12 by using a reference synchronization signal used in the cable television company etc.

Further, for the transmitting portion 18 to identify the audio and/or video data from the library portion 12, it is possible to use the method of the transmitting portion 18 comparing the identifier data (ID) of the audio and/or video data contained in the filing-list and the identifier data (ID) attached to the audio and/or video data by the library portion 12, the method of determining in advance at what cycle of the reference synchronization signal from when the transmitting portion 18 transmits the filing-list the library portion 12 should transmit the audio and/or video data to the transmitting portion 18, or the method of using an automatic recording function between the library portion 12 and the transmitting portion 18.

Next, an explanation will be made of the reproduction of the audio and/or video data by the unit modules $2b_1$ to $2b_n$ of the transmitting portion 18.

In each of the unit modules $2b_1$ to $2b_n$, the control unit 260 controls the recording units $220_1$ to $220_m$ so as to make them reproduce the audio and/or video data indicated by the identifier data (ID) etc. from the recording position indicated by the recording position data (SOM) and storage position data (BIN) at the time indicated by the reproduction start time (START) indicated by the play-list and output the same to the transmission unit 180 via the routing unit 24.

The transmission unit 180 multiplexes the audio and/or video data input from the unit modules $2b_1$ to $2b_n$ and transmits the same to the broadcast use line.

As explained above, according to the server system 1 of the present invention, it is possible to configure the library device for centrally managing the broadcast use audio and/or video data and the transmission portion for managing the audio and/or video data to be transmitted to the channels by using the unit modules 2a and $2b_1$ to $2b_n$ basically having the same structure. Accordingly, the scale of the system can be flexibly changed in accordance with the size of operation of the cable television company etc. by changing the number of unit modules 2a of the library portion 12 and the number of the unit modules $2b_1$ to $2b_n$ of the transmitting portion 18.

Further, the unit modules in the library portion 12 and transmitting portion 18 operate exactly the same operation, therefore it is possible to use unit modules of the same configuration for both of the library portion 12 and the transmitting portion 18 with very little change, for example, just making the recording capacity of the recording and/or reproducing portion 22 used in the library portion 12 larger than the recording capacity of the unit modules used in the transmitting portion 18. Accordingly, it is not necessary to develop and design a different unit module for every purpose, therefore the development costs etc. can be lowered.

First Modification

Below, an explanation will be made of a first modification (server system 3) of the above embodiment (server system 1) by referring to FIG. 6.

Figure 6:
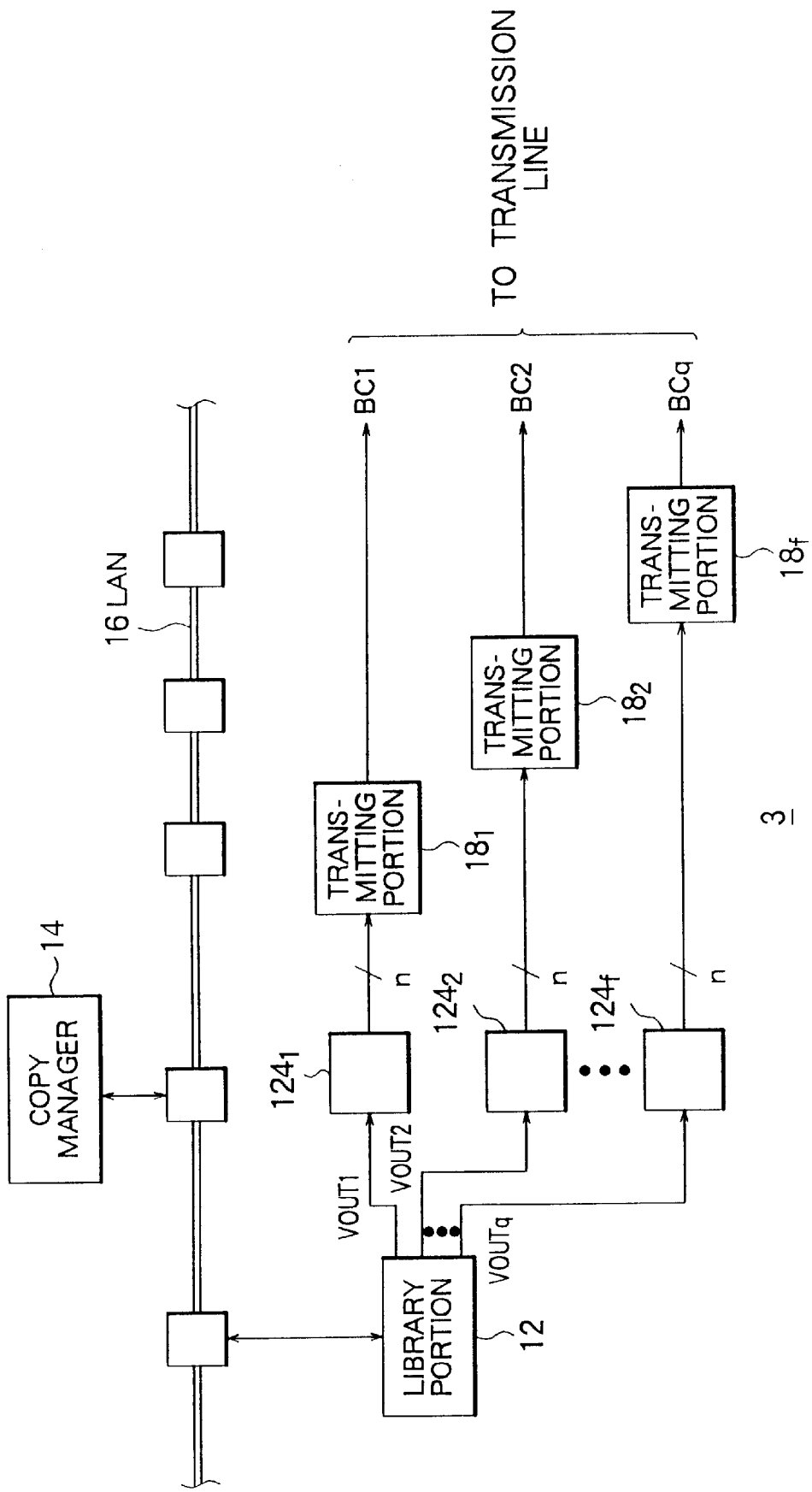
FIG. 6 is a view of a first modification of an embodiment of the present invention.

FIG. 6 is a view of the first modification of the embodiment of the present invention. Note that, in FIG. 6, the reference numerals and symbols are given to the same constituent parts among the constituent parts of the server system 3 as those of the server system 1 shown in FIG. 1.

As shown in FIG. 6, the server system 3 comprises the library portion 12, f (f=2 to q) number of distribution devices $124_1$ to $124_f$ respectively connected to the output terminals $VOUT_1$ to $VOUT_q$ of the unit module 2a (FIG. 1; not illustrated in FIG. 6) of the library portion 12, and transmission portions $18_1$ to $18_f$ respectively connected to the distribution devices $124_1$ to $124_f$.

In the above embodiment, only one among the q number of output terminals $VOUT_1$ to $VOUT_q$ of the unit module 2a was used in the library portion 12, but as shown in FIG. 6, by connecting transmission portions $18_1$ to $18_f$ to each of the output terminals $VOUT_1$ to $VOUT_q$ of the unit module 2a, it is possible to increase the number of channels supported by the server system up to f×q number of channels at the maximum.

Second Modification

Below, an explanation will be made of a second modification (server system 4) of the above embodiment (server system 1) by referring to FIG. 7.

FIG. 7 is a view of the second modification of the embodiment of the present invention. Note that, in FIG. 7, the same reference numerals and symbols are given to the same constituent parts among the constituent parts of the server system 4 as those of the server systems 1 and 3 shown in FIG. 1 and FIG. 3. The transmission unit 180 is omitted for simplification of the illustration.

As shown in FIG. 7, the server system 4 comprises the library portion 12, r number of unit modules $2_1$ to $2_r$ having the same structure and same function as those of the unit modules 2a and $2b_1$ to $2b_n$ (FIG. 1, FIG. 2) connected to the library portion 12 via the distribution unit 124, distribution devices $124_{1s}$ to $124_{rs}$, s number of which each being connected to each of the unit modules $2_1$ to $2_r$, and unit modules $2_{111}$ to $2_{rsn}$, n number of which each being connected to the distribution devices $124_{1s}$ to $124_{rs}$.

In the server system 4, the copy manager 14 converts the filing-list output by the unit modules $2_1$ to $2_r$ to the play-list and outputs the same to the library portion 12.

Further, the copy manager 14 converts the filing-list output by the unit modules $2_{111}$ to $2_{rsn}$ to the play-list and outputs the same to the unit modules $2_1$ to $2_r$.

The function and operation of each part of the server system 4 other than the copy manager 14 are the same as those in the server systems 1 and 3.

The server system 1 is configured by the unit module 2a of the library portion 12 and the n number of unit modules $2b_1$ to $2b_n$ of the transmitting portion 18 connected in cascade in two stages, but the number of channels supported by the server system can be increased up to r×s×n×q number of channels at the maximum by further increasing the number of stages of cascade connection to three as in the server system 4 and transmitting and receiving the filing-list and play-list among the three cascade connected stages via the copy manager 14 and the LAN 16.

The number of channels supported by the server system can be further increased by increasing the number of stages of cascade connection of the server system 4 and carrying out the conversion processing between the filing-list and play-list among stages of unit modules cascade connected in four or more stages by the copy manager 14.

Other Modifications

Note that the configurations of the filing-list shown in FIG. 4 and the play-list shown in FIG. 5 are examples. Changes such as an increase of the types of data contained in these lists, change of order of data, and deletion of unrequited data are possible according to need.

Further, in the server systems 1, 3, and 4 (FIG. 1, FIG. 6, and FIG. 7), the number of the unit modules contained in the library portion 12 is not limited to one. It is also possible to connect a plurality of unit modules to the receiving unit 120 and VTR 122 etc. in parallel and connect the transmitting portion 18 to each of these plurality of unit modules.

Further, while the case where the library portion 12 of the server systems 1, 3, and 4 carries out the operation of recording the audio and/or video data indicated by the filing-list set by the user at first was shown above, for example, by first changing the operation of the server systems 1, 3, and 4 so that each of the unit modules of the latter stage of the library portion 12 first outputs all of the filing-lists to the copy manager 14, the copy manager 14 then converts these filing-lists to the play-lists and sets the same in the library portion 12, and the library portion 12 then records the audio and/or video data based on the set play-lists, all audio and/or video data can be recorded and managed by the library portion 12 by just setting the play-list for the unit modules of the latter stage. It is unnecessary to set the filing-list for the library portion 12.

Further, the server systems 1, 3, and 4 can be applied to other purposes, for example, recording, reproduction, and transmission of computer programs, in addition to the recording, reproduction, and transmission of audio and/or video data.

Further, in the server systems 1, 3, and 4, the case was shown where the unit modules of each stage of the cascade connection transmitted all of the filing-lists to the copy manager 14, but the operation of the server system 1 can be changed so that only the filing-list of the audio and/or video data which the status data of the filing-list indicates has not been recorded (not filed) is transmitted to the copy manager 14. By this change of operation, the traffic of the LAN 16 can be reduced.

Further, it is also possible to change the operation of the server system 1 so that the filing-list generation portions 262 of the unit modules of each stage set a priority order for the audio and/or video data, for example, the filing-lists are transmitted to the copy manager 14 in the order from the filing-list indicating the audio and/or video data of the earliest reproduction start time (START), and transmit the filing-lists to the copy manager 14 according to this priority order.

As explained above, according to the present invention, it is possible to construct a server system of specifications tailored to the scale of operations of the cable television company etc. by combining unit modules of the same configuration.

Further, according to the present invention, it is possible to change the specifications of the server system easily and flexibly in accordance with an increase in the number of channels offered by the cable television company etc.

What is claimed is:

1. A data transmission apparatus comprising unit modules connected in cascade in a plurality (x; $2 \leq x$) of stages and a list converting means, wherein;

each of said unit modules comprises
a recording and/or reproducing means,
a first-list generating means for generating a first list indicating the data to be recorded in said recording and/or reproducing means,
a second-list receiving means for receiving a second list indicating the data to be reproduced from said recording and/or reproducing means, and
a data supplying means for supplying the reproduced data to the next stage unit module, said recording and/or reproducing means of each of said unit modules records the data indicated in said first list generated by said first-list generating means among the data supplied from the outside and reproduces the data indicated in said second list received at said second-list receiving means, and said list converting means converts a first list generated by a first-list generating means of a y($2 \leq y \leq x$)th stage unit module to a second list and outputs the same to the second-list receiving means of all unit modules or some unit modules of the (y−1)th stage.

2. A data transmission apparatus as set forth in claim 1, wherein;

said first list and said second list include at least status data indicating whether the data indicated by said first list and said second list have been recorded in said recording and/or reproducing means or have not been recorded, and said recording and/or reproducing means of each of said unit modules reproduces the data which the corresponding status data indicates have not been recorded among the data indicated in the received second list.

3. A data transmission apparatus as set forth in claim 1, wherein, said first list and said second list include at least status data indicating whether the data indicated by said first list and said second list have been recorded in said recording and/or reproducing means or have not been recorded, said first-list generating means of each of said unit modules supplies a third list comprised of the status data indicating data have not been recorded out of said first list to said list converting means, and said list converting means converts said status data of said third list generated by a first-list generating means of a y-th stage unit module to a second list.

4. A data transmission apparatus as set forth in claim 1, wherein
said data is video data and/or audio data.

5. A data transmission method for transmitting data from unit modules, each including recording and/or reproducing means for recording data supplied from the outside and reproducing the recorded data, connected in cascade in a plurality of stages (x; $2 \leq x$), comprising:

- a first step of generating a first list indicating data to be recorded in a recording and/or reproducing means of a y($2 \leq y \leq x$)th stage unit module;
- a second step of converting said first list generated at said first step to a second list indicating the data recorded in said recording and/or reproducing means to be reproduced;
- a third step of outputting said second list converted at said second step to all of the unit modules or some of the unit modules of the (y−1)th stage; and
- a fourth step of receiving said second list output at said third step and reproducing the recorded data from the recording and/or reproducing means based on said second list.

6. A data transmission method as set forth in claim 5, further having the step of said y-th stage unit module generating said second list and reproducing the data recorded in said recording and/or reproducing means of the y-th stage unit module.

7. A data transmission method as set forth in claim 5, further having the step of a unit module of the (y−1)th stage receiving said second list output at said third step, converting the same to said first list, and recording the data indicated in said first list among the data supplied from the outside in said recording and/or reproducing means of the (y−1)th stage.

* * * * *